US008472587B2

(12) United States Patent
Haunschild et al.

(10) Patent No.: US 8,472,587 B2
(45) Date of Patent: Jun. 25, 2013

(54) COLLIMATOR WITH AN ADJUSTABLE FOCAL LENGTH

(75) Inventors: Norbert Haunschild, Aarbergen (DE); Ullrich Herda, Wiesbaden (DE); Uwe Siedenburg, Essenheim (DE); Martin Hartick, Bad Nauheim (DE); Patricia Schall, Weiterstadt (DE)

(73) Assignee: Smiths Heimann GmbH, Wiesbaden (DE)

( * ) Notice: Subject to any disclaimer, the term of this patent is extended or adjusted under 35 U.S.C. 154(b) by 1733 days.

(21) Appl. No.: 11/878,785

(22) Filed: Jul. 26, 2007

(65) Prior Publication Data

US 2011/0182404 A1 Jul. 28, 2011

Related U.S. Application Data

(63) Continuation of application No. PCT/EP2006/000396, filed on Jan. 18, 2006.

(30) Foreign Application Priority Data

Jan. 26, 2005 (DE) ........................ 10 2005 016 656

(51) Int. Cl.
*G21K 1/04* (2006.01)
*G21K 1/02* (2006.01)
*G01N 23/20* (2006.01)

(52) U.S. Cl.
USPC .............................. 378/147; 378/71; 378/150

(58) Field of Classification Search
USPC ............ 378/147–151, 70, 71, 82, 83, 86–88, 378/90
See application file for complete search history.

(56) References Cited

U.S. PATENT DOCUMENTS

| | | | | |
|---|---|---|---|---|
| 5,008,911 | A | 4/1991 | Harding | |
| 5,231,652 | A | 7/1993 | Harding | |
| 5,394,453 | A | 2/1995 | Harding | |
| 5,602,893 | A * | 2/1997 | Harding | 378/86 |
| 6,122,344 | A * | 9/2000 | Beevor | 378/88 |
| 6,986,604 | B2 * | 1/2006 | Sembritzki | 378/207 |
| 7,397,900 | B2 * | 7/2008 | Papaioannou et al. | 378/147 |
| 7,436,934 | B2 * | 10/2008 | Hartick et al. | 378/150 |
| 7,519,152 | B2 * | 4/2009 | Smith et al. | 378/69 |
| 7,564,947 | B2 * | 7/2009 | Cernik | 378/71 |
| 2001/0033636 | A1 * | 10/2001 | Hartick et al. | 378/88 |
| 2002/0181656 | A1 | 12/2002 | Ries et al. | |
| 2005/0104603 | A1 * | 5/2005 | Peschmann et al. | 324/637 |

FOREIGN PATENT DOCUMENTS

| | | | |
|---|---|---|---|
| DE | 2003753 | | 9/1970 |
| DE | 2539646 | A1 | 3/1977 |
| DE | 10330521 | A1 | 2/2005 |
| EP | 0360347 | A2 | 3/1990 |
| EP | 0462658 | A2 | 12/1991 |
| EP | 0556887 | A1 | 8/1993 |
| JP | 2001-208705 | | 8/2001 |

* cited by examiner

*Primary Examiner* — Anastasia Midkiff
(74) *Attorney, Agent, or Firm* — Muncy, Geissler, Olds & Lowe, PLLC

(57) ABSTRACT

The invention relates to a collimator with adjustable focal length, especially for use in X-ray testing devices whose operating principle is based on diffraction phenomena in an object. Fixed focal length collimators used in such X-ray testing devices have to be displaced over a large range. The aim of the invention is to reduce the range of displacement. For this purpose, the collimator has at least two diaphragms having respective substantially circular slots arranged about a common center axis, wherein at least one diaphragm can be displaced along the center axis.

9 Claims, 2 Drawing Sheets

COLLIMATOR WITH AN ADJUSTABLE FOCAL LENGTH

This nonprovisional application is a continuation of International Application No. PCT/EP2006/000396, which was filed on Jan. 18, 2006, and which claims priority to German Patent Application No. DE 102005016656, which was filed in Germany on Jan. 26, 2005, and which are both herein incorporated by reference.

BACKGROUND OF THE INVENTION

1. Field of the Invention

The present invention relates to a collimator with an adjustable focal length, particularly in x-ray inspection systems.

2. Description of the Background Art

Inspection methods with the use of x-rays are employed particularly in the detection of critical substances and objects in luggage or other freight. For this purpose, multi-stage systems are known whose first stage is based on the absorption of x-radiation. To detect certain critical substances such as, for example, explosives, a second stage is employed to which objects from the first stage are selectively supplied. Systems whose operating principle is based on diffraction phenomena are used as the second stage. In this case, the diffraction angle at which an incident x-ray is diffracted depends on the atomic lattice distance of the material to be analyzed and the energy and thereby the wavelength of the incident radiation. By analyzing the diffraction phenomena by means of x-ray detectors, conclusions can be reached about the lattice distance and thereby about the material. This type of two-stage system is disclosed, for example, in the German patent application 103305211.

Because x-ray inspection systems work with extremely low radiation intensities, highly sensitive detectors are employed. To avoid measurement inaccuracies, it must therefore be achieved that only the radiation produced by the testing device strikes the detector. In addition, care must be taken that radiation diffracted only at a single point is detected, because otherwise localization within the object to be examined is not possible. Spatial filtering is therefore necessary, which is performed by a so-called collimator.

Because it is technically very costly to generate monochromatic x-radiation, the highly limited x-ray used for testing, the so-called pencil beam, has an energy spectrum known, for example, from measurements. It follows from the Bragg equation that the incident radiation is diffracted at each point at an angle that depends on the radiation energy. Radiation with an energy spectrum is therefore diffracted within an angle range, and thereby the diffraction is rotation symmetric about the incident pencil beam. In an x-ray inspection, it is desirable to detect only radiation diffracted at a certain angle. This is also achieved with the use of a collimator. The passband of the collimator corresponds substantially to the generated surface of a cone whose tip coincides with the point whose diffraction properties are to be analyzed. To examine an area within an object, a plurality of points must be focused.

German patent application 103305211 discloses a method for the examination of an object area in which the setup comprising a detector and collimator can be moved in the direction of the incident x-ray. The disadvantage of this method is that, on the one hand, a highly precise traveling unit is required and, on the other, the entire device must have an overall height more than twice the height of the object to be examined.

A second possibility is the use of a collimator that has a plurality of parallel apertures of the same aperture angle and with which therefore a plurality of points on the rotation axis can be focused simultaneously. The use of a non-segmented detector, which is not position-sensing and therefore provides a common output signal for all focused points, however, results in the disadvantage that the evaluation and clear assignment of the detected radiation to a diffraction point are difficult. With use of a segmented detector, which, for example, is divided into separately evaluable circular rings, this disadvantage in fact does not arise, but this type of detector is laborious and costly.

SUMMARY OF THE INVENTION

It is therefore an object of the present invention to simplify the structure and operation of an x-ray inspection system based on the diffraction principle.

This object of the invention is attained by a collimator with an adjustable focal length, which is characterized by at least two diaphragms each with at least one substantially circular slot about a common central axis, whereby at least one diaphragm is movable along the central axis.

This type of collimator includes substantially an x-radiation-absorbing housing. Within the housing, there are at least two parallel diaphragms, each with at least one substantially circular slot about a common central axis. This central axis corresponds to the rotation axis of the desired cone-shaped passband of the collimator. It is possible to vary the aperture angle and thereby the focal length of the collimator by the parallel displacement of at least one diaphragm along this central axis. In a detector/collimator combination unmovable relative to object to be examined, this angle adjustment corresponds to an adjustment of the focus along the central axis and thereby to the selection of a desired point within the object to be examined. To increase the effectiveness of the collimator and thereby the entire inspection system, the diaphragms consist advantageously of highly radiation-absorbing material. This assures that substantially only the radiation striking at the set angle and passing through the slot reaches the detector disposed behind the collimator.

In an advantageous manner, the collimator of the invention with an adjustable focal length is used in an x-ray inspection device, which has an x-ray source, a collimator, and an x-ray detector. In this regard, the broad-band x-ray source emits a highly limited pencil beam. This beam strikes the object to be examined, is diffracted, and strikes the x-ray detector through the collimator.

A possible area of application of this type of x-ray inspection device is the use as the second stage in an x-ray inspection system. In this case, objects examined in the first stage if required can be supplied to the second stage, which is based on the diffraction principle and uses a collimator of the invention. This type of second stage is suitable particularly for the detection of explosives.

With the use of this type of x-ray examination device, an x-ray examination procedure can be performed in which the object to be examined is radiated with a pencil beam of broad-band x-radiation and diffraction spectra are taken for different diaphragm settings by means of the x-ray detector. In this case, first a focal length is set by positioning the diaphragms and thereby a specific point is focused. In this case, the collimator allows only the radiation to pass that is diffracted at the angle specified by the diaphragm setting at the focused point. Comparison of the received spectrum measured at the detector with the known spectrum of the emitted pencil beam can determine the energy at which diffraction at the set angle occurred. The atomic structure of the material at the focused point can be determined and the substances present there identified.

In an embodiment, there is the possibility that the taken spectra are compared with reference spectra. Thus, for example, reference spectra for known critical substances can be taken at different diaphragm settings and stored. Because a pencil beam with the same energy spectrum is used in measuring the reference spectra and the later inspection procedure, the critical substances can be easily identified by comparison of the received spectrum with the reference spectra.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
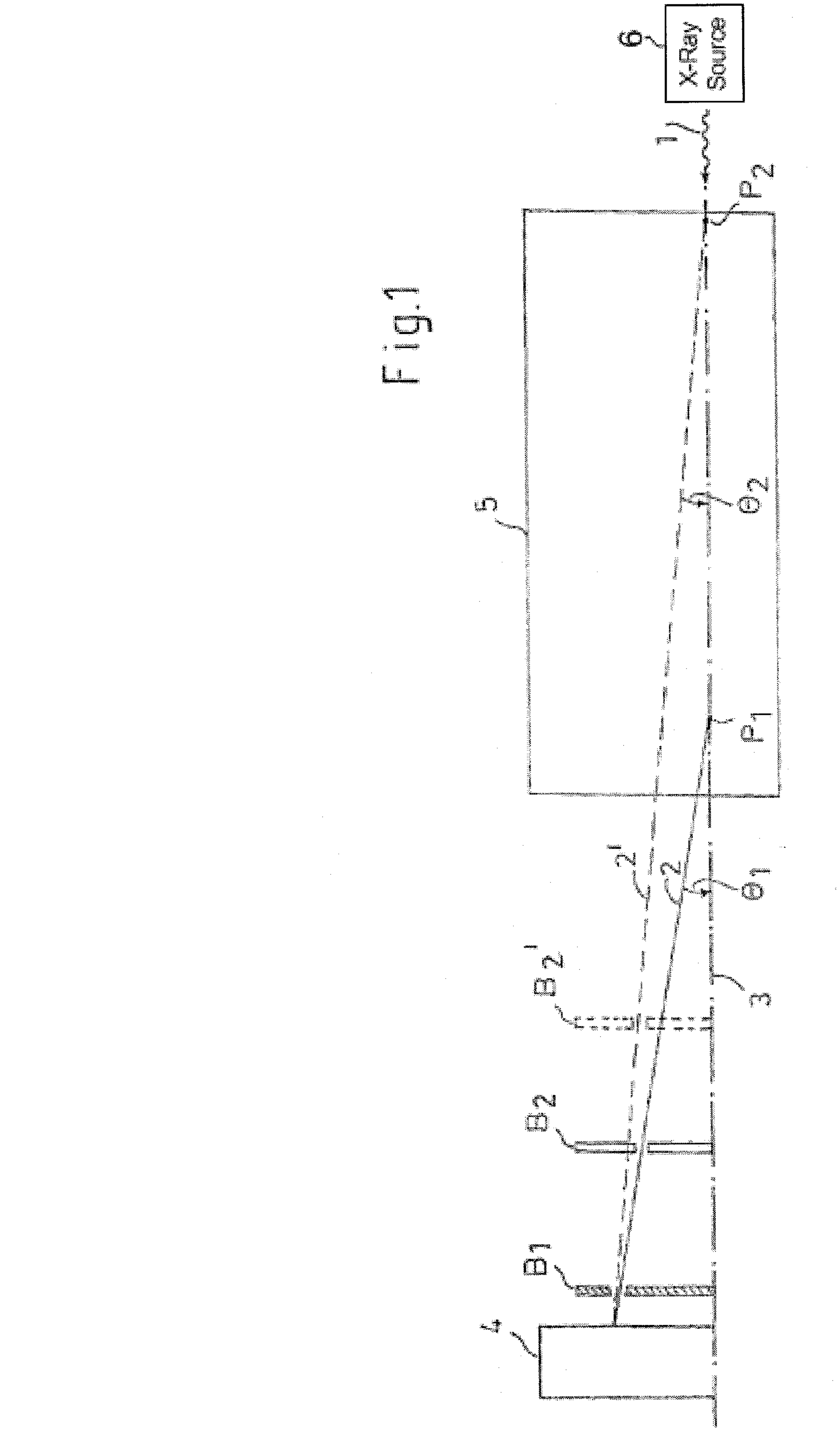
FIG. 1 illustrates an adaptive collimator with a fixed and a movable diaphragm.

The figures show an operating mode of a collimator with an adjustable focal length with at least two diaphragms, each with at least one substantially circular slot about a common central axis, whereby at least one diaphragm can be displaced along the central axis. The collimator is used in an x-ray inspection system for detecting explosives. For reasons of clarity, a few elements, such as, for example, the housing of the collimator, were omitted. As far as is expedient, in the figures the same elements are provided with the same reference characters.

In both exemplary embodiments, an object 5 is to be examined along axis 3 for critical substances. Axis 3 is simultaneously the rotation axis of the diffraction phenomenon and the central axis for the diaphragms and their substantially circular slots. Object 5 to be examined is radiated with a pencil beam 1 of broad-band x-radiation along axis 3, whereby the radiation is diffracted in object 5. Then, diffraction spectra are taken for different diaphragm settings by means of x-ray detector 4. The collimator performs a spatial filtering before the diffracted beam strikes detector 4. The x-ray source 6 generates radiation 1 with a known energy spectrum. The substance located at the diffraction point is identified by comparison of the taken spectra with reference spectra.

In FIG. 1, $B_1$ designates a fixed diaphragm, which is placed near detector 4. $B_2$ designates a movable diaphragm, which is drawn in a second position using a broken line and is designated by $B'_2$. This diaphragm can be displaced along axis 3 parallel to $B_1$. In the first position of diaphragm $B_2$, a focus of the collimator forms at point $P_1$. In this position, the collimator allows only radiation 2 diffracted at the detection angle $\Theta_1$ to pass. In a second position of diaphragm $B'_2$, the focus of the collimator is directed at point $P_2$. In this case, only radiation 2' diffracted at the angle $\Theta_2$ strikes detector 4 through the collimator. The movable diaphragm can be positioned as desired, so that the focal length of the collimator can be adjusted.

The angle $\Theta$ is known from the diaphragm setting. The energy spectrum of the diffracted beam is measured by means of detector 4. It follows from the Bragg equation that $E*\sin\Theta$ is a material-specific constant. The material present at the diffraction point can be unequivocally identified from this relationship.

Figure 2A:
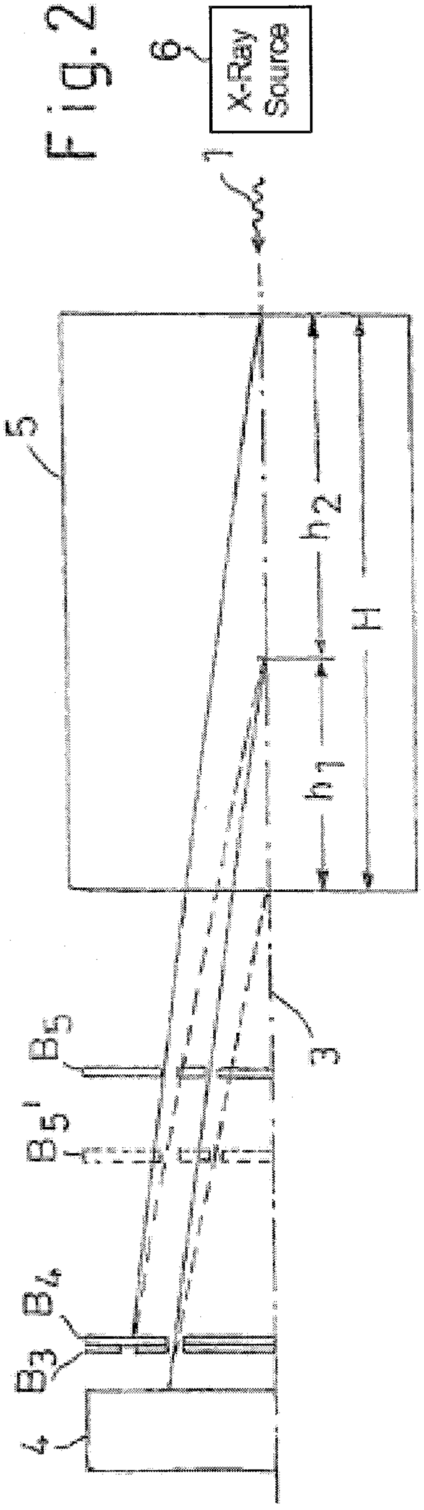
FIG. 2*a* illustrates an adaptive collimator with a fixed and two movable diaphragms in a first basic position.
Figure 2B:
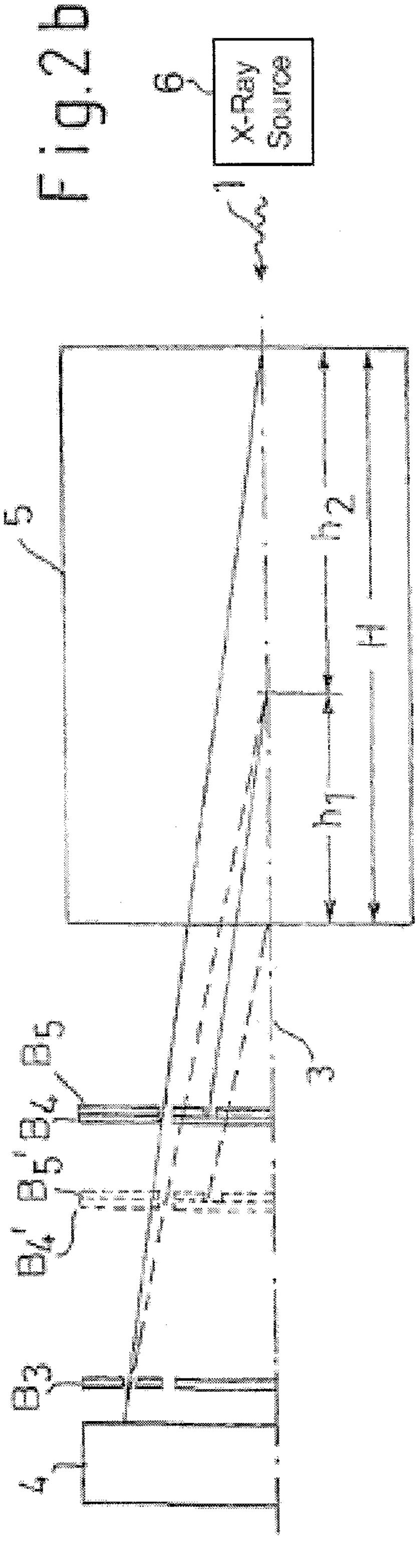
FIG. 2*b* illustrates an adaptive collimator with a fixed and two movable diaphragms in a second basic position.

With a large spatial dimension of the object to be examined, the aperture angle of the collimator must be adjustable over a wide range. It follows from the Bragg equation that large angles of scatter are associated with low energies. Low energies, however, can lead to transmission problems through the test object. In this case, the spatial dimension of the object can be divided into several sections. In FIGS. 2*a* and 2*b*, the entire dimension H of object 5 is divided into two subareas $h_1$ and $h_2$. In this case, the collimator includes a fixed diaphragm $B_3$ and two movable diaphragms, $B_4$, $B'_4$ and $B_5$, $B'_5$. Here, diaphragms $B_4$, $B'_4$ have a substantially circular slot. Diaphragms $B_3$ and $B_5$, $B'_5$ each have two concentric, substantially circular slots. In this case, the single slot of diaphragm $B_4$, $B'_4$, the inner slot of diaphragm $B_3$, and the outer slot of diaphragm $B_5$, $B'_5$ have the same distance from the central axis 3.

FIG. 2*a* shows the configuration of object 5 for examination of area $h_1$. Here, diaphragm $B_4$ adjoins diaphragm $B_3$ and covers its outer slot. Solely diaphragm $B_5$, $B'_5$ is moved. In the extended drawn position, the right edge of area $h_1$ is focused with diaphragm $B_5$, and the left edge in the position designated by the broken line by $B'_5$. In the intermediate positions, any point in area $h_1$ can be focused.

FIG. 2*b* shows the configuration for examination of area $h_2$. In this case, diaphragms $B_4$ and $B_5$ or $B'_4$ and $B'_5$ are directly adjacent to one another and are moved together. Diaphragm $B_4$ covers the inner slot of diaphragm $B_5$ or $B'_4$ covers the inner slot of $B'_5$. Any point in area $h_2$ can be focused by combined movement of the two diaphragms. The position (shown extended) of diaphragms $B_4$ and $B_5$ can be seen in the figure, in which the right boundary point of area $h_2$ is focused, as well as the position, shown by the broken line of diaphragms $B'_4$ and $B'_5$ in which the left boundary point of area $h_2$ is focused.

In an alternative embodiment, the geometry of the diaphragms may be simplified, when a segmented x-ray detector is used. In this case, the detector is divided, for example, into several circular segments, which are arranged concentrically around the central axis of the collimator and whose output signals can be evaluated separately.

In order to prevent interfering effects of the diaphragms when the angle is being set, these should have the lowest possible material thicknesses. To achieve the best possible shadowing effect, therefore, a highly radiation-absorbing material is to be used for producing the diaphragms, such as, for example, a tungsten compound.

The foregoing exemplary embodiments represent only two possible embodiments of the invention and are not limiting in this respect. In particular, the number of diaphragms, their movability, and the number and position of the slots can be varied as desired.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An X-ray inspection device, comprising:

a broadband x-ray source emitting a clearly delimited pencil beam;

a collimator having an adjustable focal length, the collimator comprising at least two diaphragms each with at least one substantially circular slot about a common central axis defining a spatial filter that is offset from the central axis, wherein at least one diaphragm is movable along the central axis to select a desired point within an object to be examined; and a segmented x-ray detector for measuring diffraction spectra from the collimator, the segmented x-ray detector being divided into a plurality of segments.

2. The X-ray inspection device according to claim 1, wherein the diaphragms comprise radiation-absorbing material.

3. An X-ray inspection method with use of an x-ray inspection device according to claim 1, wherein the object to be examined is radiated with the pencil beam and diffraction spectra are taken for different diaphragm settings by the x-ray detector.

4. The method according to claim 3, wherein the taken spectra are compared with reference spectra.

5. The X-ray inspection device according to claim 1, wherein the at least two diaphragms comprise a first diaphragm with at least one substantially circular slot about the common central axis, and second and third diaphragms with at least two concentric, substantially circular slots about the common central axis, the second and third diaphragms being movable along the central axis.

6. The X-ray inspection device according to claim 2, wherein the radiation-absorbing material comprises a tungsten compound.

7. The X-ray inspection device according to claim 1, wherein the segmented x-ray detector is divided into a plurality of circular segments arranged concentrically around the central axis, each segment being configured to provide its own corresponding output signal.

8. The X-ray inspection device according to claim 1, wherein the at least one diaphragm that is movable along the central axis to select a desired point within the object to be examined is movable with respect to at least one other diaphragm.

9. The X-ray inspection device according to claim 1, wherein each slot about the common central axis defines a first circular shaped region over the central axis that blocks radiation, a second ring shaped region around the first region that passes radiation, and a third ring shaped region around the second region that blocks radiation, thereby forming the spatial filter in the shape of a slot that encircles but is offset from the central axis.

* * * * *